F. E. CHADWICK.

Improvement in Combined Rolling-Pin and Dough-Cutter.

No. 128,462. Patented July 2, 1872.

Witnesses.
W. A. Saunders.
H. E. Boardman.

Frances E. Chadwick
by F. Curtis
Att'y

UNITED STATES PATENT OFFICE.

FRANCES E. CHADWICK, OF GARDINER, MAINE, ASSIGNOR TO HERSELF AND N. K. CHADWICK, OF SAME PLACE.

IMPROVEMENT IN COMBINED ROLLING-PINS AND DOUGH-CUTTERS.

Specification forming part of Letters Patent No. 128,462, dated July 2, 1872.

Specification describing an Improved Implement for Culinary Purposes, invented by Mrs. FRANCES E. CHADWICK, of Gardiner, Kennebec county, State of Maine.

This invention consists in a combination of a culinary rolling-pin and a dough-cutter; the invention being carried out by disposing the cutter bottom upward upon a suitable bar, which surmounts the rolling-pin, the arrangement of the two being such that, when the pin is in use upon the dough to reduce it to a uniform thickness, the cutter remains above and is carried with the pin; but when such dough is to be cut into biscuit, cakes, &c., the entire device is inverted and the cutter placed below the pin, in which position it is available for cutting the dough reduced by the pin.

Figure 1:
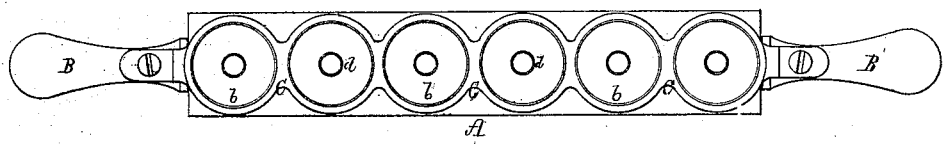
Figure 2:
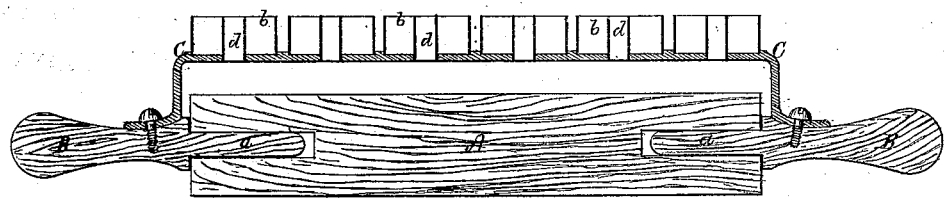

The drawing accompanying this specification, in which Figure 1 is a plan, and Fig. 2 a vertical section of my invention, represent at A a rolling-pin, such as is used in rolling dough in culinary operations, the handles of such pin being shown at B B as independent thereof, and having a journal, $a$, extending axially into the pin to constitute a turning-point for the latter. The two handles B B are united and confined together by an arched bar or strap, C, which extends alongside of and parallel with the axis of the pin A. Upon the outer face of the bar or strap C, and from end to end thereof, I dispose a series of cylindrical cutters, $b\ b\ b$, &c., of equal length, such cutters being formed upon or affixed to the strap in any suitable manner. These cutters may be cylindrical, as shown, or they may be of any irregular or ornamental form that taste may suggest, and they are to be provided preferably with a central axial tube or lesser cylinder, $d$, which is so applied as to be readily removed or inserted. This central tube is to be employed when the center of the cake of dough is to be open, as in the case of dough-nuts, &c., and is to be removed when the cake of dough is to be left entire, as in the case of biscuit, &c. From the above it will be seen that I combine in one convenient and compact implement a rolling-pin and dough-cutter, neither of which is in the way while the other is in use, the only act necessary to bring one or the other into action being to reverse the entire device.

What I claim, and desire to secure by Letters Patent, is—

A combined rolling-pin and dough-cutter, consisting of the handles B, journaled roller-pin A, bar or strap C, and cutters $b$, said parts being constructed and arranged for joint operation, substantially as herein shown and set forth.

FRANCES E. CHADWICK.

Witnesses:
MARIA E. BARKER,
A. C. STILPHUR.